United States Patent [19]
Crater et al.

[11] Patent Number: 5,997,167
[45] Date of Patent: Dec. 7, 1999

[54] PROGRAMMABLE CONTROLLER INCLUDING DIAGNOSTIC AND SIMULATION FACILITIES

[75] Inventors: Kenneth C. Crater, North Grafton; Daniel L. Pierson, Hudson, both of Mass.

[73] Assignee: Control Technology Corporation, Hopkinton, Mass.

[21] Appl. No.: 08/846,467

[22] Filed: May 1, 1997

[51] Int. Cl.[6] .................................................. G05B 9/02
[52] U.S. Cl. ......................................... 364/184; 364/185
[58] Field of Search .................................. 364/184, 185, 364/140.01, 140.04, 140.06–140.1, 141–147, 148.06, 578, 528.37; 702/179, 180, 181

[56] References Cited

U.S. PATENT DOCUMENTS

| | | | |
|---|---|---|---|
| 3,551,892 | 12/1970 | Driscoll, Jr. . | |
| 4,453,208 | 6/1984 | Middleton et al. | 364/140 |
| 4,709,347 | 11/1987 | Kirk | 364/900 |
| 4,827,396 | 5/1989 | Taniguchi | 364/140 |
| 4,835,676 | 5/1989 | Kumar et al. | 364/142 |
| 5,195,024 | 3/1993 | Kurokawa et al. | 364/140 |
| 5,208,743 | 5/1993 | Nishikawa | 364/140 |
| 5,222,229 | 6/1993 | Fukuda et al. | 395/550 |
| 5,257,206 | 10/1993 | Hanson | 364/148.06 X |
| 5,291,389 | 3/1994 | Iwata | 364/140.06 X |
| 5,319,775 | 6/1994 | Loges et al. | 395/575 |
| 5,327,349 | 7/1994 | Hoste | 364/468 |
| 5,345,589 | 9/1994 | King et al. | 395/650 |
| 5,365,423 | 11/1994 | Chano | 364/141 |
| 5,408,405 | 4/1995 | Mozumoer et al. | 364/151 |
| 5,410,651 | 4/1995 | Sekizawa et al. | 395/200 |
| 5,434,997 | 7/1995 | Landry et al. | 395/575 |
| 5,453,933 | 9/1995 | Wright et al. . | |
| 5,537,547 | 7/1996 | Chan et al. | 395/200.02 |
| 5,752,008 | 5/1998 | Bowling | 395/500 |

OTHER PUBLICATIONS

Yep et al., Proc. of the Region Ten Conference '93 (1993) at 343–46.
Doydum et al., J. Manuf. Sys. 10:209–222 (1991).
Tang et al, IEEE Transac. Control Sys. 3:319–329 (1995).
Kempf et al., "Chaotic Behavior in Manufacturing Systems," *Proc. of 3d Ann. Chaos in Manufacturing Conf.*(1994).

Primary Examiner—Paul P. Gordon
Assistant Examiner—Victoria Robinson
Attorney, Agent, or Firm—Cesari and McKenna, LLP

[57] ABSTRACT

A controller for one or more pieces of industrial equipment accommodates multiple sensed conditions—that is, different conditions each associated with a different response, which may be an alarm or a branch control procedure. The controller includes a database of diagnostic templates specifying conditions, and actions or states associated therewith. For example, a template may provide multiple, specified, discrete time spans each reflecting a different machine condition, and each specifying a different action associated with that condition. The templates may be associated with a model of machine behavior, e.g., one based on probabilities, which utilizes the templates and programmed control instructions to simulate machine behavior over time. More broadly, the behavior model may be used to perform a simulated execution of control instructions based on various specified values for limit parameters, which may be provided by the user or computed in accordance with the behavior model (e.g., using a Monte Carlo method) as simulation proceeds.

29 Claims, 4 Drawing Sheets

PROGRAMMABLE CONTROLLER INCLUDING DIAGNOSTIC AND SIMULATION FACILITIES

FIELD OF THE INVENTION

The present invention relates to industrial automation, and in particular to programmable controllers for operating and monitoring industrial processes and equipment.

BACKGROUND OF THE INVENTION

Sophisticated industrial processes, such as oil refining, automobile assembly or power generation, require the cooperative execution of numerous interdependent tasks by many different pieces of equipment. The enormous complexity of ensuring proper task sequencing and management, which requires not only appropriate logic but constant monitoring of equipment states to organize and distribute operations and detect malfunction, has resulted in the widespread adoption of programmable controllers. These controllers operate elaborate industrial equipment in accordance with a stored control program. When executed, the program causes the controller to examine the state of the controlled machinery by evaluating signals from one or more sensing devices (e.g., temperature or pressure sensors), and to operate the machinery (e.g., by energizing or de-energizing operative components) based on a logical framework, the sensor signals and, if necessary, more complex processing. The "inputs" to a particular controller can extend beyond the sensed state of the equipment the controller directly operates to include, for example, its environment, the state of related machinery or he state of its controllers.

Because of the frequently intricate, interdependent nature of industrial equipment assemblages, a simple step-by-step procedural framework can be inadequate for controlling processes with reliability; if the control sequence lacks routines for handling, for example, failure of vulnerable components, the process will either come to an abrupt, unexpected halt or continue to the point of possible damage. Accordingly, modern controllers frequently incorporate some form of diagnostic capability that recognizes specific failure conditions and alerts an operator to the source (or, in more sophisticated arrangements, initiates recovery sequences). For example, U.S. Pat. No. 4,827,396 describes a sequential controller that evaluates specified conditions at each control step for abnormalities; an input signal is compared with an expected input value at the current control step, and if the controller detects an inconsistency, it issues an alarm.

Such systems exhibit certain drawbacks. Merely checking for binary failure conditions—either the system has failed or is operating properly—does not address the diversity of possible abnormalities exhibited by complex equipment, which may operate over a spectrum of states; for example, between total failure and normal operation, a machine may exhibit reduced load capacity or suboptimal (but acceptable) efficiency, with some intermediate states being predictive of future malfunction or signalling the need for different forms of response procedures.

Binary-failure systems are even less adequate in the context of multiple-machine systems such as advanced assembly lines, where behavior frequently is nonlinear or chaotic in nature (see, e.g., Kempf et al., "Chaotic Behavior in Manufacturing Systems," *Proc. of 3d Ann. Chaos in Manufacturing Conf.* (1994)). In such cases, small deviations in sensed conditions can have large consequences for machine behavior that evolve over time. The determination of a proper response to deviant conditions, accordingly, cannot be handled reliably merely by looking up conditions in a troubleshooting table associated with a particular machine. Instead, adequate error handling must account for behavior at a system-wide level, with due regard, for example, to the influence exerted by the overall system on a particular piece of equipment.

DESCRIPTION OF THE INVENTION

Brief Summary of the Invention

The present invention offers a framework for sophisticated control of complex systems. In a first aspect, the invention comprises a controller for one or more pieces of industrial equipment that accommodates multiple sensed conditions—that is, different conditions each requiring a different response, which may be an alarm or a branch control procedure. The controller of the present invention is preferably a state-based system incorporating a user-programmable state language, such as the QUICKSTEP™ programming language supplied by Control Technology Corporation, Hopkinton, Mass. State languages are organized by defining control "steps," each of which consists of executable commands that create action, and one or more executable instructions for leaving the step. For example, a step might initiate machine action, then wait for confirmation (e.g., an electronic signal from the controlled machine) that the action has been completed before progressing to the next step, which initiates another machine action. In this way, the control program mimics the operation of the machine itself.

In the context of the present invention, the controller may comprise a database that provides, for each state, a diagnostic template specifying conditions and associated actions, processes or states. For example, a step may comprise an action and a wait process requiring, before transition to the next step, receipt of a control signal confirming completion of the action. The duration of the wait process, as well as the nature of the control signal, may serve to indicate a variety of system conditions, such as inefficient operation, an impending failure state or the severity of a current failure state. Accordingly, the template may provide multiple, specified, discrete time spans each reflecting a different machine condition, each condition specifying an action associated therewith. For example, if the controlled machine processes a workpiece, early confirmation of action completion may indicate that the machine is not loading properly, while excessive times to completion may signal a jam. Alternatively or in addition, the template may accommodate a range of possible input values (e.g., a control signal whose magnitude indicates the level of a continuously variable parameter such as tank pressure), specifying a different action associated with different input levels. These condition-indicating variables are herein referred to as "limit parameters."

The actions specified in the template entries might include, for example, issuing an alarm, adding the input value or time to a list for contemporaneous or subsequent review by the system operator, updating a display, branching to a failure-recovery sequence, or continuing the present state or process; the absence of an action (e.g., if the input value or time falls within the normal working range specified in the template) allows the controller simply to proceed with program execution. Each template entry, representing a different machine condition (e.g., normal operation and varying degrees of deviation), may be associated with a different action or with no action at all.

In a second aspect, the invention associates the time or other limit parameter specified in the template with a model of machine behavior, preferably one based on probabilities. The controller, a computer connected thereto, or a computer performing control functions further comprises means for performing a simulated execution of the remaining control instructions based on the various limits. For example, suppose the limit parameter is time and the various limits specify the machine conditions Low Error, Low Warn, Normal, High Warn and High Error; the probabilistic model of machine behavior—which preferably reflects operation not of the isolated machine but as installed in its operating environment—simulates machine operation given the sensed value of the limit parameter and the remaining control instructions. The simulation may require or permit the operator to supply some input data (e.g., operating parameters), and may also be self-modifying (e.g., altering the shape and height of the probability curves in response to sensed parameters in order to make the curves more accurate) and/or modifiable by the operator. The simulation may be a Monte Carlo simulation that dictates, in accordance with the probabilities and the control instructions, transitions among states.

The results of the simulation may be displayed graphically or otherwise presented to the operator. It should be stressed, however, that performance of the simulation need not supplant actual machine operation; the system can, if desired, continue to operate even as the simulation proceeds. Indeed, the results of the simulation and the progress of actual machine operation can be simultaneously rendered in separate windows of a single graphical display. In this way, the operator can dynamically compare true machine behavior to expected behavior, and observe forecasts of future states.

In a third aspect, the invention comprises a system for simulating the operation of one or more machines and/or processes based on a behavior model. The system may or may not be connected to the machine or process, or to a programmable controller associated therewith. Thus, the system may be a stand-alone computer having programmed thereon a behavior model describing the behavior of the equipment, with input—i.e., sensed parameter values— originating with the equipment, the operator, or some combination. In this way, the operator is free to study the behavior of the equipment without actually running it under stressful conditions, or at a remote site. Once again, the behavior model is preferably expressed as a series of probability distributions describing the likelihood of various transitions and states, and may be supplied by the user or derived, e.g., from repeated system observations under operating conditions or from a diagnostic template.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
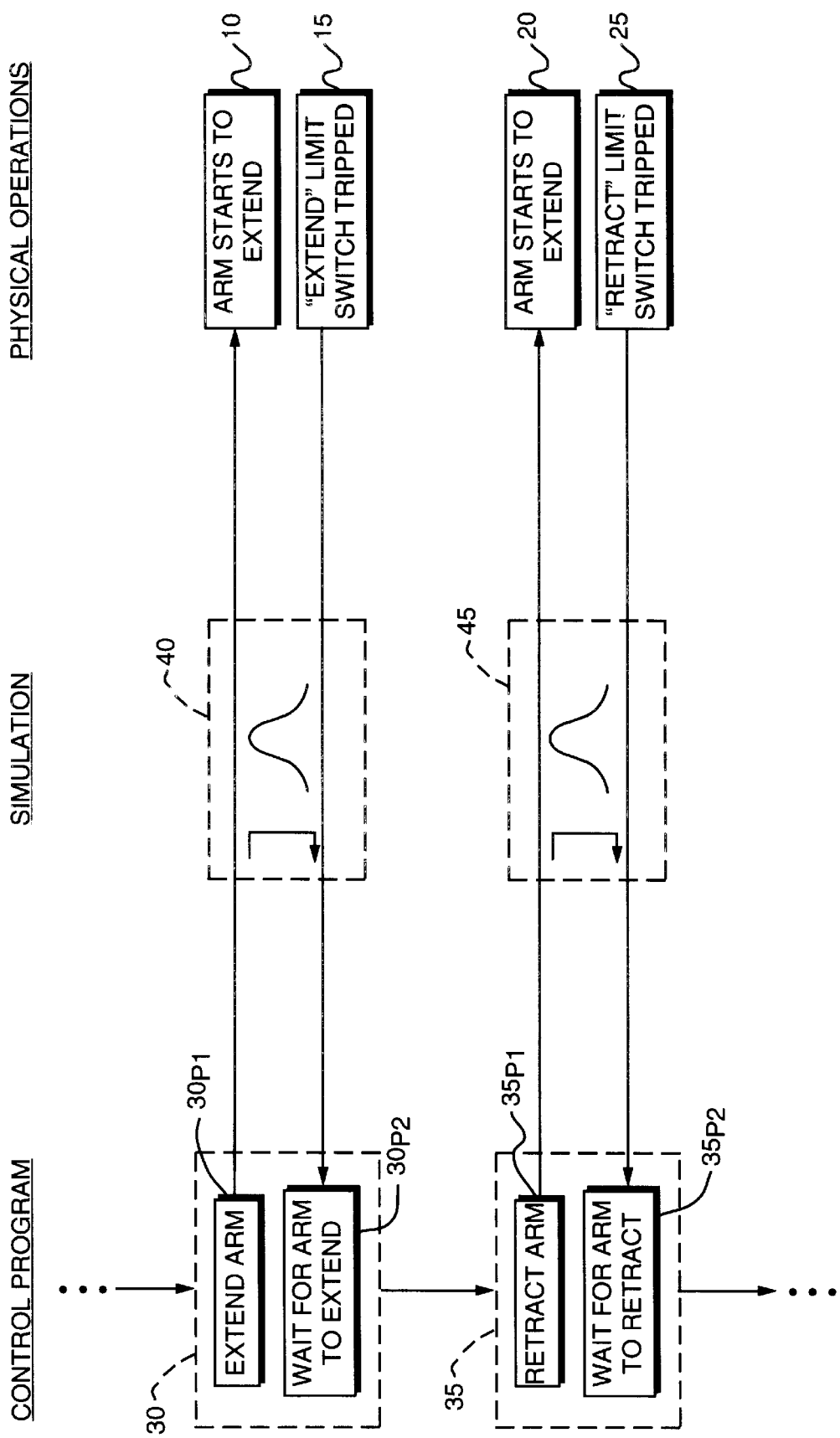
FIG. 1 diagrammatically represents execution and simulation of a control program in accordance with the present invention.

Refer first to FIG. 1, which illustrates the approach to simulation taken by the present invention. For exemplary purposes the figure, as well as the ensuing discussion, focuses on a simple mechanical machine having a piston arm that extends until it trips an "extend" limit switch. The extended arm then retracts until a "retract" limit switch is actuated. These physical operations are illustrated as a series of control steps 10–25.

The corresponding control sequence causing these operations is shown at the left of the figure. In a first state or step 30, the arm is extended. Step 30 comprises two separate but simultaneously active processes: in an action process $30_{P1}$, the controller operates the machine to extend the arm by means of control signals (represented by the forward arrow); in a wait process $30_{P2}$, the controller awaits confirmation from the machine (by means of a signal represented by the reverse arrow) that the arm has been fully extended. A "transition" is said to occur when the conditions for completion of process $30_{P2}$ have been satisfied; at this point, the control program jumps to the next step in the sequence, i.e., step 35. Once again, step 35 comprises an action process $35_{P1}$ during which the controller operates the machine to retract the arm; and a wait process $35_{P2}$ during which the controller awaits confirmation that the arm has been fully retracted.

A simulation engine, as described in greater detail below, simulates the behavior of the controlled machine. The action control signals are received by the simulation engine, either in conjunction with or in lieu of the controlled machine. The simulation engine contains a model of machine behavior, generating a response based on this model. In the more typical case, where the simulation engine replaces the controlled machine, the behavior model generates a return signal (causing a state transition) only as dictated by the model. Thus, the simulation engine includes a pair of behavior models 40, 45 corresponding to steps 30, 35; the behavior models are preferably probabilistic in nature. At step 30, the simulation engine receives the control signal prompting arm extension. Based on the current state of the system, the simulation engine evaluates the likelihood of a successful transition based on behavior model 40, and if that likelihood is sufficient, the range of possible values of at least one sensed limit parameter associated therewith; in this case, the parameter would be time. For example, based on a probabilistic analysis of the current state and history of the system, the simulation engine may judge the likelihood that the arm will successfully extend and, if this is more likely than not, the expected (i.e., median or mean) duration before this occurs; when this time has elapsed, the simulation engine issues the return signal, causing state transition.

Figure 2:
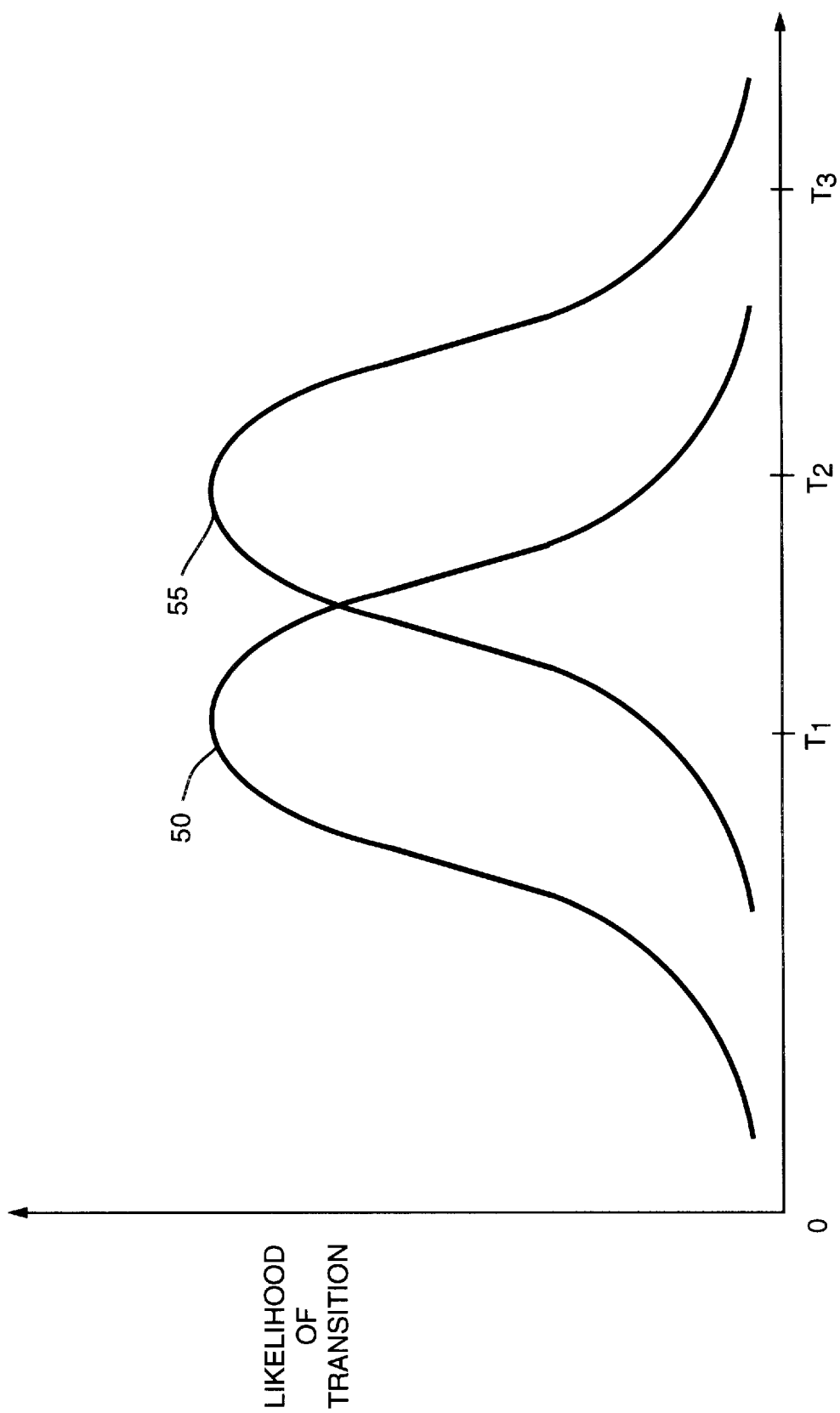
FIG. 2 illustrates a series of probability curves associated with behavioral models.

Accordingly, as shown in FIG. 2, behavioral model 40 may comprise a series of curves defining probability distributions (usually, but not necessary Gaussian, each individually previously computed and stored, or instead computed as needed in the course of operation) associated with different operating modes of the controlled machine or system, and representatively illustrated at 50, 55. For example, curve 50 might reflect the expected behavior in a normally operating system (with a mean time $t_1$ to transition), while curve 55 reflects the expected behavior in a system whose transition in a previous equivalent cycle took longer than $t_1$ to complete; alternatively, the two curves can represent an older and a newer system. Where the simulation engine replaces the actual system (so as to run a true simulation without the need for machine operation), the "knowledge" of the system state and history exhibited by behavior model can be accumulated as the simulation proceeds, or instead provided by operator input. For example, if the operator selects the initial state and parameter value, the simulation engine, with its behavioral models for all control steps, allows the operator to observe the expected progress of the system through these steps based on the specified initial conditions. More preferably, however, the simulation engine specifies the initial state based on a behavior model.

To perform such a full simulation, it is preferred to use a Monte Carlo method whereby the input (i.e., the value of the limit parameter(s)) to each step is a random or pseudorandom number generated in accordance with the probabilities associated with that step, based on the current system state and its history. Suppose, for example, that step 30 is the first step in the control sequence, and that the operator specifies a normal transition time. Assume further that the probability curves shown in FIG. 2 apply to state 35, and that a normal transition time in step 30 specifies curve 50 as the proper behavioral model for step 35. Under a Monte Carlo simulation, the time to transition in step 35 is derived from curve 50 in accordance with the simulation; for example, in a highly simplified simulation with the least amount of randomization, the transition time would be very close to $t_1$. This time is used to determine the behavioral model for the next step in the control sequence, and so on. The details of Monte Carlo simulations are well characterized in the art, and readily available to those of ordinary skill without undue experimentation; see, e.g., Kalos & Whitlock, *Monte Carlo Methods* (John Wiley 1986).

In accordance with the diagnostic capabilities of the present invention, described in greater detail below, different values of the limit parameters may be associated with specified error conditions, requiring branch to special exception-handling sequences or an alert to the operator. For example, a transition not occurring until time $t_3$ might signal a failure condition; because this time, while unlikely, nonetheless represents a possible result of the Monte Carlo simulation, its selection prompts execution of the associated failure-recovery or alert routine.

As indicated earlier, the simulation capabilities of the present invention need not be carried out to the exclusion of the actual machine or system under control. Instead, control signals may be provided both to the simulation engine and the controlled machine or system; the simulation engine can be configured to immediately compute and provide the operator with the most likely (e.g., mean or median) limit parameter value for the current step—e.g., the expected time to transition given the behavior model and prior actual system behavior—and may also simulate subsequent steps in accordance with the Monte Carlo method, dynamically forecasting the future evolution of the system and warning the operator of projected failure states well in advance of their actual occurrence. With each transition to a new state in the control sequence, the simulation engine updates the behavior models and re-initiates simulation of subsequent states. In this way, simulation can be combined with actual monitoring of the system.

It should be emphasized that while the foregoing discussion focused on a single limit parameter (time), this is merely for convenience of presentation. The behavior model can similarly cover different or additional parameters associated with the state of the machine (e.g., temperature, pressure, etc.), the control sequence providing branch points to different routines or exception-handling sequences depending on the value of any of various monitored limit parameters. Furthermore, as described below, the probability curves themselves need not be static; the behavioral models can themselves respond to continued experience with the controlled system.

Figure 3:
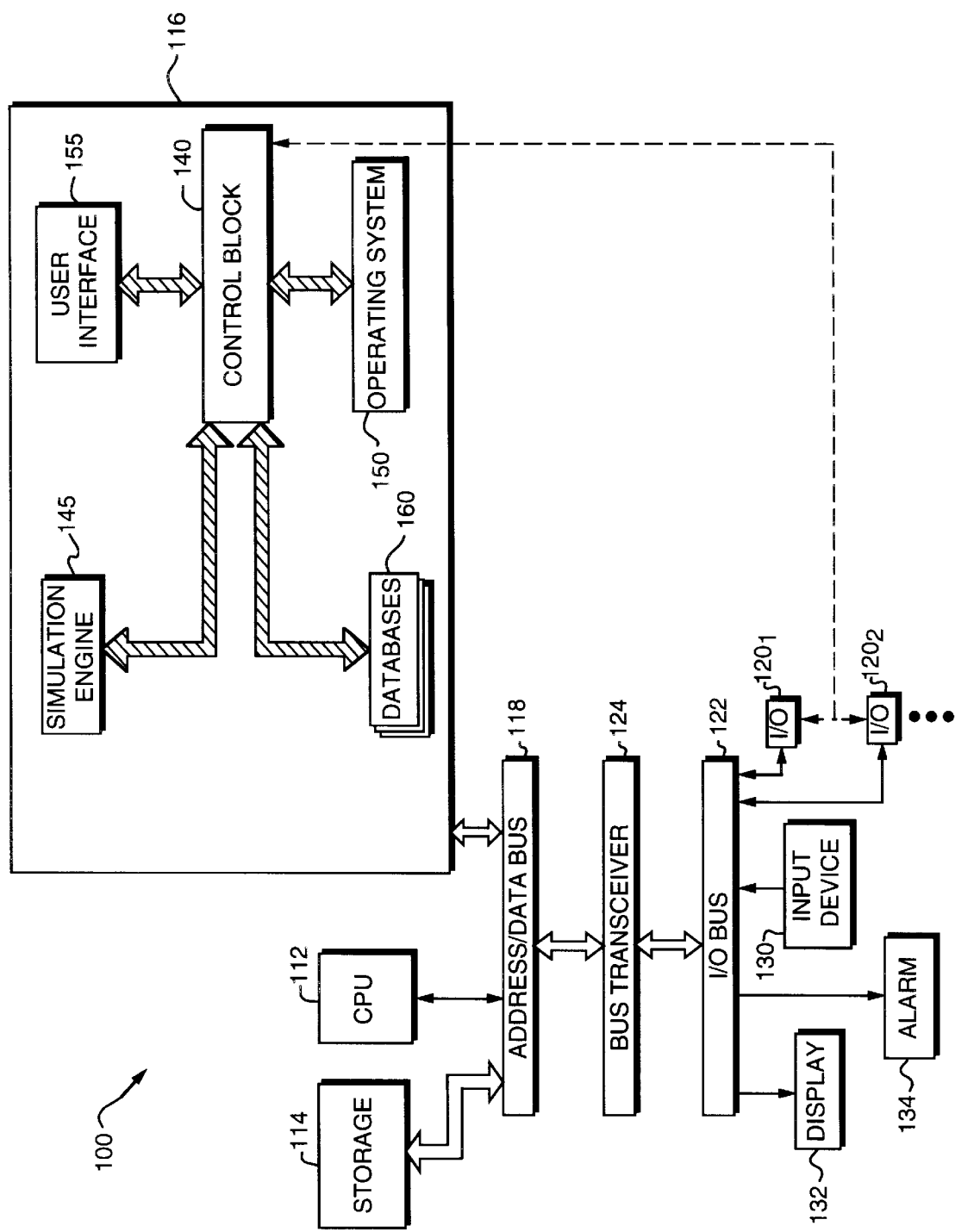
FIG. 3 schematically depicts a control system in accordance with the present invention.

Refer now to FIG. 3, which illustrates a hardware architecture for a system embodying the invention. A representative control system, indicated generally at 100, executes program instructions to operate, for example, a piece of industrial equipment, and/or to portray simulations of such operation. The system 100 includes a central processing unit ("CPU") 112 and one or more computer storage devices indicated generally at 114, 116. Ordinarily, storage device 114 provides nonvolatile mass storage, and may be, for example, an EEPROM, Flash ROM, hard disk or CD-ROM drive; and storage 116 comprises a combination of volatile random-access memory ("RAM") for temporary storage and processing, and nonvolatile, programmable read-only memory ("PROM") that contains permanent aspects of the system's operating instructions.

CPU 112 and computer storage 114, 116 communicate over an internal system bus 118. If implemented as a controller for an actual machine or device (rather than for simulation only), the system 100 further includes a series of input/output (I/O) modules shown representatively at $120_1$, $120_2$ that sense the condition of, and send control signals to, the controlled machine over a machine interface (indicated by arrows). This machine interface, which may involve direct wiring or include a communication link for interaction over a computer network or telephone lines, facilitates the bidirectional exchange of signals between each I/O module and an associated device (e.g., a sensor or an actuator). I/O modules 120 connect to a secondary I/O bus 122, which is driven by a bus transceiver 124; in effect, buses 118, 122 and bus transceiver 124 form a single logical bus.

If implemented as a computers system 100 also comprises one or more input devices (such as a keyboard, a position-sensing device such as a mouse, or both) 130, also connected to I/O bus 122, that permit the operator to enter information. The output of either device can be used to designate information or select particular areas of a screen display (e.g., a CRT) 132 to direct functions to be performed by the system. The system 100 may optionally contain an alarm 134 that issues a sensible (e.g., audible) alert to the operator upon activation by CPU 112.

Storage 116 contains a series of functional blocks or modules that implement the functions performed by system 100 through operation of CPU 112. A control block 140 contains computer-executable instructions for actually operating controlled equipment via I/O modules 120, or for provision to a simulation engine 145 for simulated operation, or to both ends. These instructions are read in rapid sequence and interpreted to examine the condition of selected sensing devices associated with (actual or simulated) controlled equipment, and, based thereon, to cause the system 100 to send appropriate operative control signals to the equipment and/or to simulation engine 145. Typically, the instructions are written in a relatively high-level language that not only permits manipulation of input and output data, but also provides arithmetic and timing functions, and, as appropriate, other complex tasks. These instructions are translated into machine-readable code by means of an interpreter or a compiler. As indicated earlier, the preferred instructional paradigm is a state-control language that represents controller actions in terms of steps, each of which consists of a command that creates action and one or more instructions for leaving the step. Interpreters and compilers for this and other types of controller languages are well characterized in the art. See, e.g., U.S. Pat. Nos. 5,321,829 and 5,287,548 (the entire disclosures of which are hereby incorporated by reference) and the QUICKSTEP™ User Guide published by Control Technology Corporation, Hopkinton, Mass. Control block 140 contains both the specific high-level instructions for operating the system 100 and the interpreter (or compiler) module for translating these into instructions processed by CPU 112; its operative relationship to I/O modules 120 is indicated by the dashed line.

Particularly in a computer implementation, storage 116 may also include an operating system 150, which directs the execution of low-level, basic system functions such as memory allocation, file management and operation of storage device 114; and instructions defining a user interface 155, which facilitates straightforward interaction over screen display 132. User interface 155 generates words or graphical images on display 132 to represent a simulation, prompt action by the operator, and accept operator commands from keyboard 230 and/or position-sensing device 232. If implemented as a controller, a less elaborate input/display system and user interface—such as an operator touch screen serving as both input and display device—may be preferred.

A series of memory partitions define a plurality of databases 160, some of whose contents may originate in storage 114 for copying, as needed, into RAM. Databases 160 contain data relevant to simulation and diagnostics. With respect to the former, databases 160 comprise information relevant to the behavior model of each controlled machine or process. For example, for each sensed parameter, databases 160 may contain equations specifying a plurality of probability curves for each step in the control sequence, each curve being associated with a different range of values of the sensed parameter. More typically, however, databases 160 contain one or a few such equations, along with operators which, when applied to the equations, alter the associated curves (e.g., by shifting the mean, or narrowing or widening the curve shape) as appropriate to the control step and the particular range of values within that step to which a given curve applies.

Simulation engine 145 also contains instructions defining a Monte Carlo method, with parameters defining the particular features of the method stored in databases 160. Thus, in a pure simulation, engine 145 obtains an initial set of limit values from the operator, or generates even these randomly in accordance with the Monte Carlo method and the behavior model. Control block 140 steps through the programmed control sequence, issuing control signals to simulation engine 145 (rather than I/O modules 120), which, in turn, computes responses based on the Monte Carlo method and the appropriate probability curves in databases 160, and returns parameter information to control block 140. With renewed reference to FIG. 1, the parameter information may be a time-delayed signal indicating completion of an action, which control block 140 handles normally or as an exception, depending on the duration of the delay. Simulation engine 145 also utilizes the parameter information in determining or deriving the behavior model appropriate to succeeding steps.

In a simulation performed in conjunction with actual equipment operation, control block 140 issues control signals to I/O modules 120 as well as to simulation engine 145, which, as discussed above, automatically utilizes these and signals received from the controlled equipment to generate and present on display 132 a simulation of the future operation of the equipment, based on actual equipment operation (as manifested in the incoming and outgoing control signals) and the stored behavior models. Display 132 may also depict the current state of the actual system.

The control system 100 can also include means for deriving the behavior models associated with a controlled device, as well as means for updating the models based on actual, observed device behavior over time. In particular, probability data can be gathered (and saved in storage 114) through repetitive observation of device responsiveness; that is, by recording, over time, observed limit parameters and whether state transitions were successfully achieved in connection therewith, one can build up a statistical picture of the likelihood of state transition given various values for the limit parameters. This statistical picture constitutes a behavior model, and is expressed as a probability distribution. Its accuracy improves as additional entries are made. Such an approach to construction of behavior models is especially useful when machine behavior varies with environment (so that a behavior model of the isolated machine is insufficient to capture true behavior).

Similarly, simulation engine 145 can be configured to test the validity of the model against actual equipment performance over time, detecting long-term drift and modifying the model accordingly. For example, the response times associated with the machine whose operation is depicted in FIG. 1 may naturally increase as the machine ages, so a response indicating improper functioning of a new machine might represent normal behavior in an older machine. Simulation engine 145 can adjust the model (e.g., by shifting curves 50, 55 rightward) to accommodate this reality, either directly in response to observed machine behavior, or predictively by including a machine age parameter in the behavior model itself.

Databases 160 can also hold diagnostic information. In particular, a database may contain, for each state, a template specifying conditions and associated processes, actions or states; in this way, various modes of abnormal operation—which may be defined, for example, as deviation by a predetermined extent from a mean limit-parameter value as specified by a behavior model—can be addressed in a manner appropriate to that condition.

Figure 4:
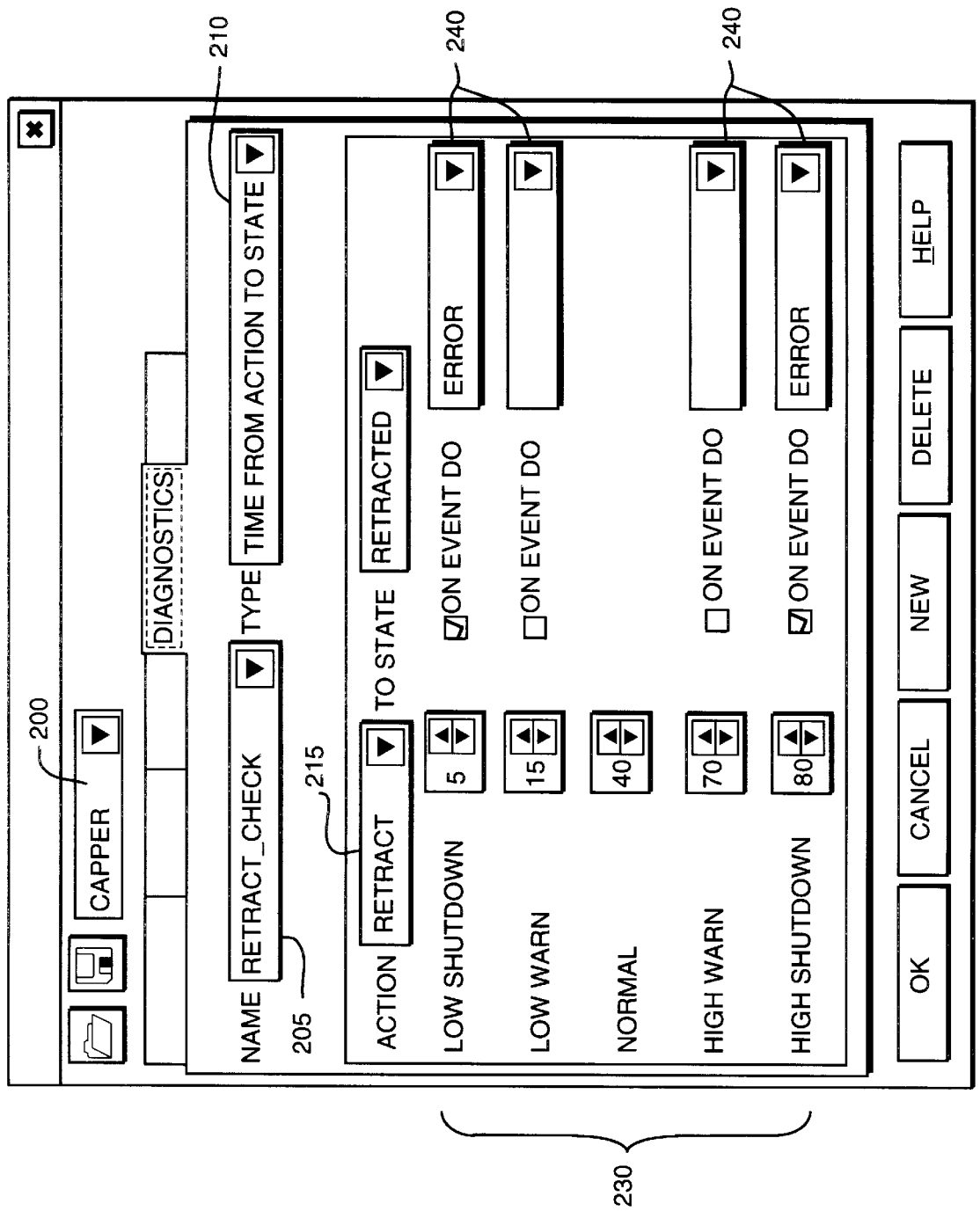
FIG. 4 is a graphical depiction of a user interface suitable for data entry into a database in accordance with the invention.

Refer to FIG. 4, which illustrates both the data fields of a representative template, as well as an interactive window for permitting the operator to enter values and response. The template pertains to step 35 (FIG. 1), titled Retract_Check for purposes of both the template and the control sequence; the overall control sequence is called CAPPER, referring to the function of the controlled machine. The "Type" field specifies the data considered in evaluating completion of the state (i.e., process $35_{P2}$); in this case, "Time from Action to State" indicates that time is the relevant limit parameter. The action process $35_{P1}$ is specified as "Retract," while the wait process $35_{P2}$ is specified as "Retracted." Interface 155, which generates the graphical depiction shown in FIG. 4 in a conventional manner, allows the operator to specify the contents of these template entries—which represent data in corresponding fields in a database 160—either by typing the name into the boxes 200, 205, 210, 215, 220 using keyboard 130, or by clicking on the down arrow associated with each box and selecting from a series of pre-loaded choices.

The template contains a series of fields relating various values or value ranges of the limit parameter to associated machine conditions, each of which may require a different form of handling—e.g., branching to a different control routine, issuing an alarm, etc. In the illustrated case, the template contains five fields 230 corresponding to five different machine conditions: Low Shutdown, Low Warn, Normal, High Warn, and High Shutdown. A limit-parameter value (in this case, a time) is entered for each condition in the associated box, either by typing or clicking on the arrows. The significance and interpretation of these entered times depends on the configuration of control block 140, which compares the sensed limit-parameter data received from the controlled machine (i.e., from I/O modules 120) to the template entries in the course of program execution. For example, in accordance with the values shown in FIG. 4, control block 140 may be configured to register a Low Shutdown condition upon state completion in 5 msec or less; a Low Warn condition for completion times in excess of 5 but equal to or less than 15 msec; a normal condition for completion times between 15 and 70 msec; a High Warn condition for completion times in excess of 70 but less than 80 msec; and a High Shutdown condition for completion times in excess of 80 msec. Naturally, different applications may have different numbers of condition fields.

For each condition other than normal, the operator may enter an action ("On Event Do"), i.e., a branch routine name or an action to be taken (e.g., trigger alarm 134) in an associated box 140. Upon detection of a condition outside the normal range, control block 140 performs the action specified in the On Event Do field. For example, the conditions Low Warn and High Warn may correspond to inefficient machine behaviors or projected failure states, requiring no immediate action or a warning to the operator; while Low Shutdown and High Shutdown may represent current failure states requiring immediate intervention or machine inactivation. The illustrated window also contains other conventional buttons along the bottom margin, which represent actions the operator may take by clicking on them.

The diagnostic templates may be combined with simulation capability by according simulation engine 145 access to the templates. In this way, the future states predicted by simulation engine 145 may be expressed in terms of template fields—that is, if a predicted future state satisfies an exception condition, the specified action is initiated (i.e., taken and represented in a simulated format).

It will therefore be seen that the foregoing represents a versatile and highly robust approach to control diagnostics and simulation. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A control system comprising:
   a. means for executing a control function comprising a variable sequence of steps;
   b. means for receiving data relevant to the control function;
   c. a database for storing (i) a plurality of limits each specifying a different condition associated with the control function, and (ii) different actions associated with at least some of the conditions; and
   d. means for comparing received data to the stored limits and, upon detection of a match therebetween, causing execution of the steps implementing any associated action;

wherein:
   e. the control function is embodied in a sequence of control instructions executable by the execution means; and
   f. the database is configured to further store a probability associated with each limit, the control system further comprising means for performing a simulated execution of the control instructions based on the probabilities and the received data.

2. The control system of claim 1 further comprising means for issuing an alert, at least some of the actions comprising actuating the alerting means.

3. The control system of claim 1 wherein at least some of the actions comprise executing a new control function.

4. The control system of claim 1 wherein at least some of the conditions are inefficient behaviors.

5. The control system of claim 1 wherein at least some of the conditions are projected failure states.

6. The control system of claim 1 further comprising means for obtaining input from a user, at least some of the received data being received from the user input means.

7. The control system of claim 6 further comprising means for altering the probabilities based on user input.

8. The control system of claim 1 further comprising a machine interface, at least some of the received data being received from the machine interface, the control function being executed via the machine interface.

9. The control system of claim 1 wherein the probabilities represent a model of machine response.

10. The control system of claim 9 further comprising means for altering the probabilities based on the received data.

11. The control system of claim 1 wherein:
    a. the execution means is configured to perform a plurality of control functions each representing a state, at least some of the functions causing a transition to a new state;
    b. the database means is configured to store, for each state, (i) a plurality of limits each specifying a different condition, (ii) an action associated with at least some of the conditions, and (iii) a probability associated with each limit; and
    c. each control function is embodied in a sequence of control instructions executable by the execution means.

12. The control system of claim 11 wherein at least some of the actions comprise transition to or initiation of new control functions.

13. The control system of claim 11 further comprising simulation means for performing a simulated execution of the control instructions based on the probabilities and the received data, the control function being executed on the simulation means.

14. The control system of claim 13 wherein the simulated execution is a Monte Carlo simulation that dictates, in accordance with the probabilities, transitions among states.

15. The control system of claim 14 wherein at least some of the probabilities are functions of time and represent machine behavior.

16. The control system of claim 15 further comprising means for interfacing to a machine to also execute the control functions thereon, at least some of the received data originating with the machine via the machine interface, the graphic display further depicting actual machine behavior based on the received data.

17. The control system of claim 13 further comprising a graphic display for depicting the simulated execution.

18. A control system comprising:
    a. means for executing a plurality of control functions pertaining to at least one machine;
    b. means for storing sequences of control instructions, each sequence implementing a control function as a state comprising an action and a predetermined condition for leaving the state, sequences being executable by the execution means; and c. means for receiving, during execution, data relevant to the state conditions so as to determine transition among states in accordance with the control instructions; and d. simulation means implementing a model of machine behavior and issuing, to the execution means and in accordance with the model, data relevant to the state conditions.

19. The control system of claim 18 further comprising means for issuing an alert, at least some of the actions comprising actuating the alerting means.

20. The control system of claim 18 further comprising means for obtaining input from a user, at least some of the received data being received from the user input means.

21. The control system of claim 18 further comprising a machine interface, at least some of the received data being received from the machine interface, the control functions being executed via the machine interface.

22. The control system of claim 18 wherein the behavior model comprises a plurality of probability distributions collectively representing a model of machine response.

23. The control system of claim 22 further comprising means for altering the probability distributions based on the received data.

24. The control system of claim 22 further comprising means for altering the probability distributions based on user input.

25. The control system of claim 18 wherein the control function is executed on the simulation means.

26. The control system of claim 25 wherein the simulated execution is a Monte Carlo simulation that dictates, in accordance with a plurality of probability distributions, transitions among control functions.

27. The control system of claim 25 further comprising a graphic display for depicting the simulated execution.

28. The control system of claim 18 further comprising mean for interfacing to a machine to perform thereon the control function, the received data originating with the machine via the machine interface.

29. The control system of claim 28 further comprising a graphic display for depicting machine behavior based on the received data.

* * * * *